2,801,814

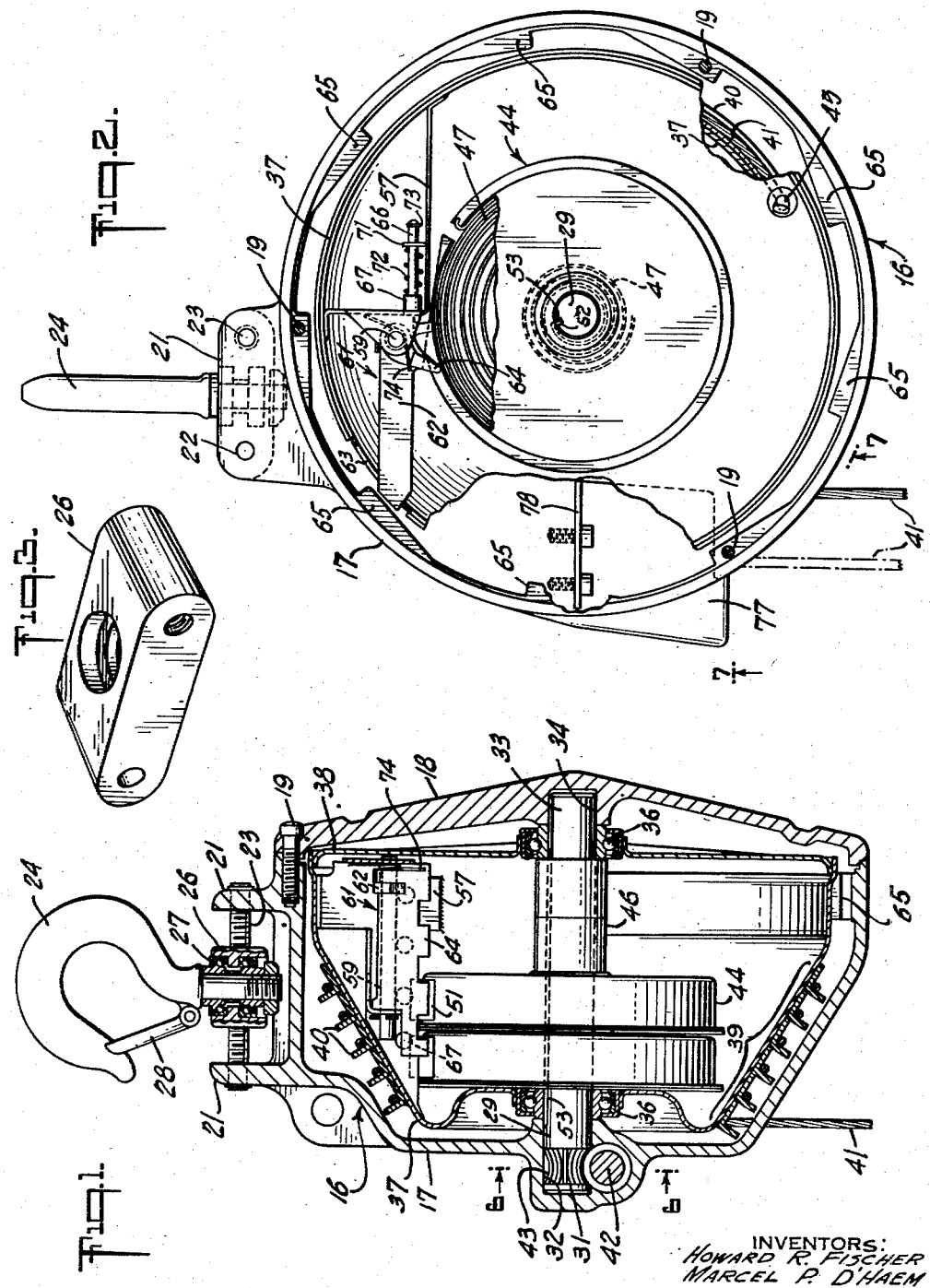

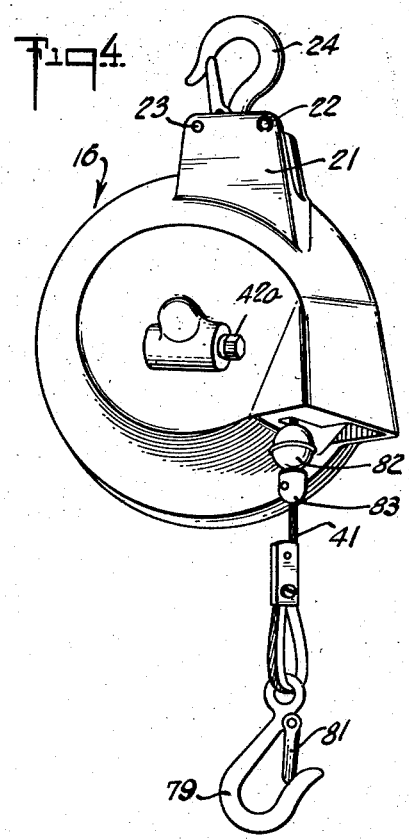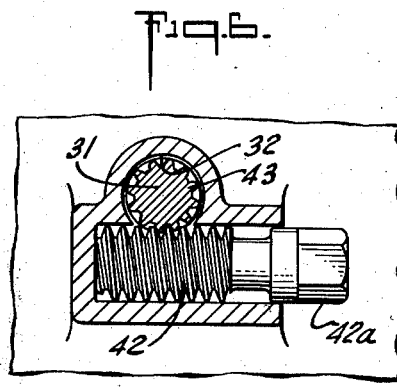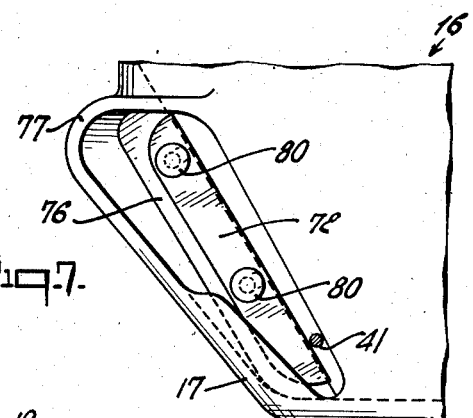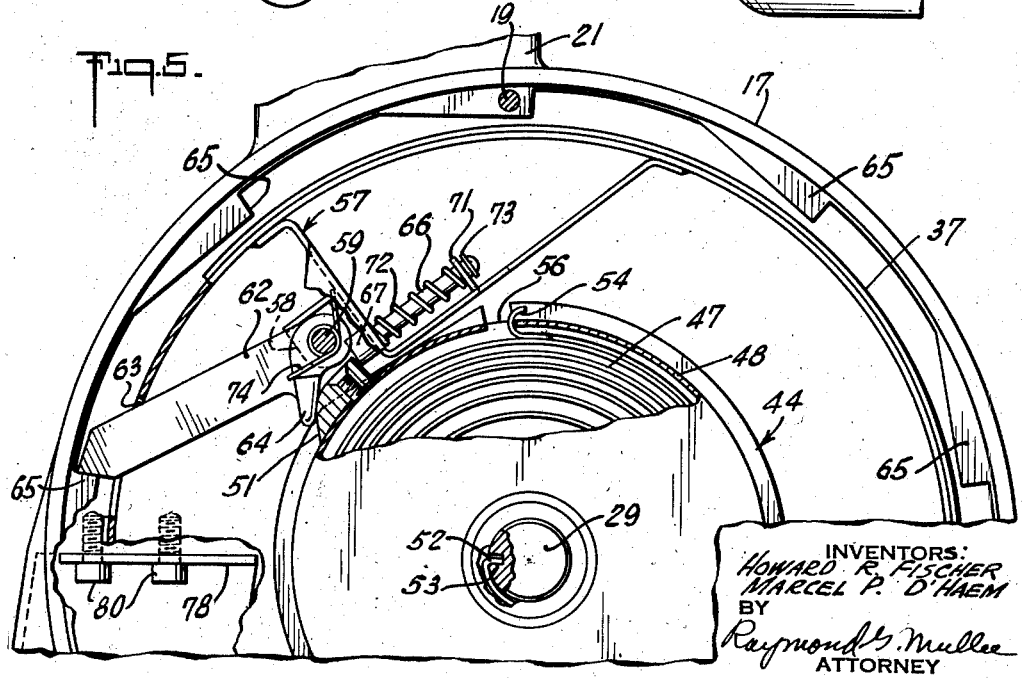

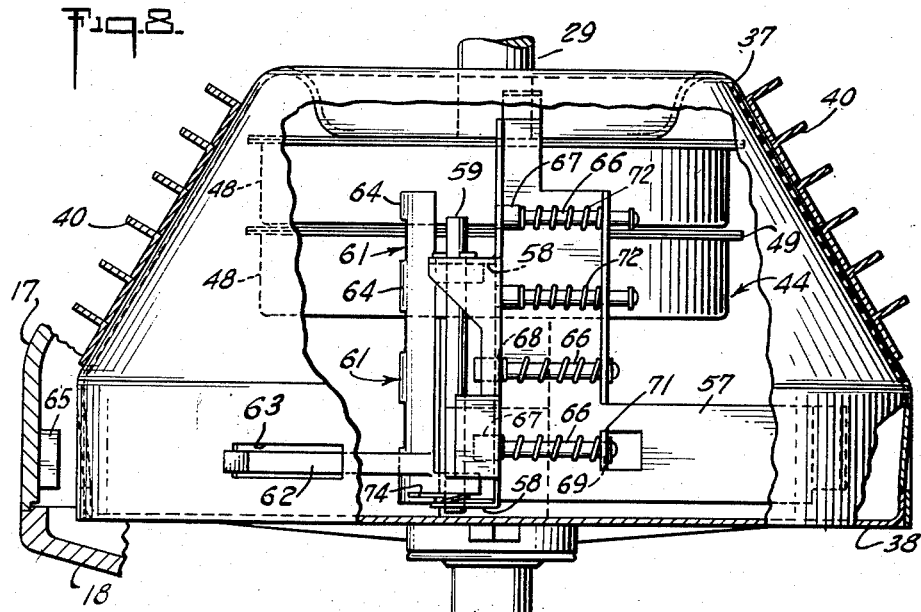
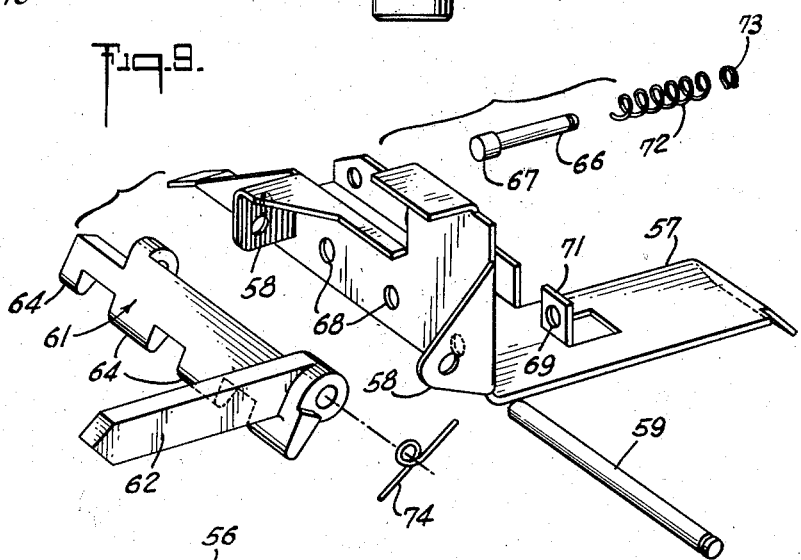
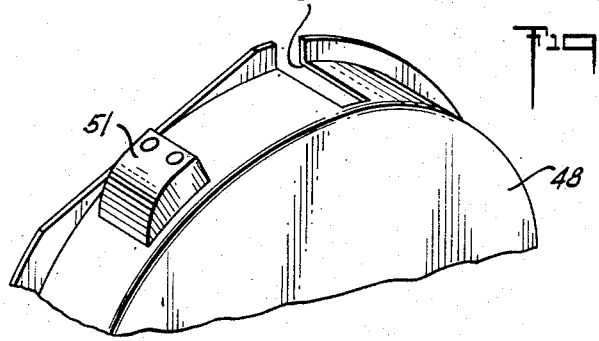
INVENTORS:
HOWARD R. FISCHER
MARCEL P. D'HAEM
BY
Raymond G. Mullee
ATTORNEY

# United States Patent Office 2,801,814
Patented Aug. 6, 1957

SPRING BALANCER

Howard R. Fischer and Marcel P. D'Haem, Utica, N. Y., assignors to Chicago Pneumatic Tool Company, New York, N. Y., a corporation of New Jersey Application April 27, 1954, Serial No. 425,858

7 Claims. (Cl. 242—107.4)

This invention relates to weight balancing devices of the spring counterbalancing type, and more particularly to improvements in construction thereof.

Weight balancing devices are commonly used for the support of portable tools, such for example as riveting tools, whereby the tool may be conveniently held and maneuvered to facilitate the work operations being performed thereby. The principles of operation of such balancers, and the usual structural arrangements thereof, are well known to those skilled in the art. As a rule such balancers include, a rotatable drum on which is wound a tool suspension cable, a coil spring arranged to be tensioned as the cable is unwound from the drum, a safety mechanism which automatically locks the drum against rotation in event the coil spring should fail, and means to adjust the coil spring to an initial tension which is sufficient to support an attached tool. In certain types of balancers, the coil spring is enclosed in a casing for the convenient handling thereof, and which further simplifies the assembly and maintenance of the balancer.

The main object of this invention is to provide a spring balancer which is of simplified construction, of low initial and maintenance cost, of light weight, and which will give long and satisfactory service.

A further object is to provide a balancer with an improved safety mechanism arrangement.

Another object is to provide a spring balancer with an increased work supporting range.

These and further objects and features of the invention will become more apparent from an understanding of the following description and the accompanying drawings wherein:

Fig. 1 is a longitudinal section view of a spring balancer made in accordance with the invention;

Fig. 2 is a side view of same with a housing cover removed and with certain parts broken away to show structural features of the balancer;

Fig. 3 is a perspective view of a hook adjusting plate used in the device of Fig. 1;

Fig. 4 is a reduced perspective view of the device of Fig. 1;

Fig. 5 is an enlarged fragmentary view of the device of Fig. 1, and illustrating a safety mechanism used thereon and showing a coil spring used in the device of Fig. 1 in broken condition;

Fig. 6 is a sectional view as seen from line 6—6 in Fig. 1;

Fig. 7 is a projection as seen from line 7—7 in Fig. 2;

Fig. 8 is a plan view of the device of Fig. 1 partly in section and with certain parts removed;

Fig. 9 is a perspective view of a safety latch assembly used in the device of Fig. 1; and Fig. 10 is a fragmentary perspective view of a spring retainer used in the device of Fig. 1.

Referring now to Figs. 1–4 of the drawings, numeral 16 indicates a spring balancer which embodies the structural features of the invention. The balancer includes a cable drum housing 17, and a housing cover 18, which is affixed to the housing by a plurality of bolt means 19, one of which is shown. The housing 17 has two flanges 21 at the upper end for receiving a guide rod 22, and an adjusting screw 23 which is positioned parallel to the guide rod. A swivel hook 24 is arranged for swivel movement in an adjusting plate 26 (Fig. 3), by means of bearings 27; the plate 26 is supported by the guide rod 22 and adjusting screw 23, and can be laterally positioned thereon by reason of the threaded engagement with the adjusting screw. A swivel hook guard piece 28 is pivotally affixed to the hook to prevent accidental removal of the swivel hook from its support. It is to be noted (Fig. 2) that the swivel hook is offset with respect to the vertical center line of the housing, so that the balancer will assume the position illustrated while it is being used to support a load.

A cable drum shaft 29 is rotatably supported within the balancer, one end 31 of the shaft being positioned in a bore 32 formed in the housing 17, while the other end 33 of the shaft is in a bore 34 formed in the housing cover 18. Rotatably supported upon the shaft 29 by ball bearings 36, is a cable drum assembly comprising a cable drum 37, and a cable drum cover 38, the latter of which has a snug fit within the end of the drum, as shown. A major portion 39 of the peripheral surface of the drum is tapered to provide a frusto-conical shape. Spirally wound upon the drum surface 39 and welded in position, is a strip of angle iron 40, which serves as a groove means for a cable 41. In comparison with the usual type of cable drums for balancers, which are formed by casting and wherein sufficient metal must be provided in the body of the drum so that a cable groove can be formed therein, the cable drum assembly of subject invention is of extremely light weight and of simple construction. Cable 41 is secured to the cable drum by placing the end thereof, which has been enlarged by addition of a leaded slug 45 thereto, in a hole formed in the cable drum, as is usual practice. The subject matter relating to the groove means formed by the angle iron 40 is not claimed herein, but has been made the subject of a separate divisional application entitled Spring Balancer Drum, Serial No. 651,062, filed April 5, 1957.

The portion of the housing containing the bore 32, is arranged to support a worm 42 which is engageable with a worm gear 43 formed on the end portion 31 of the shaft 29, as best seen in Figs. 1 and 6. The worm 42 has a head portion 42a which may be engaged by a crank (not shown) to rotate the worm and shaft 31, for purposes which will be discussed.

Positionable upon the shaft 29 are spring assemblies 44, of which there can be any number up to and including four, two being shown in the drawings. In arranging the assemblies in discrete sets, the balancer can be conditioned for a variety of load ranges, i. e., from that which one spring assembly would support, to and including four times such amount. For example, with the use of various spring assemblies it is possible to condition the balancer for load ranges as follows: 4 to 8 lbs.— one spring assembly, 8 to 15 lbs.—2 spring assemblies, 15 to 22 lbs.—3 spring assemblies, and 22 to 30 lbs.—4 spring assemblies. Spacers 46 are used to take the place of missing assemblies. It will be seen (Fig. 1) that spring assemblies 44, or spacers 46, are positionally maintained against axial movement between the bearings 36, once the housing cover 18 is fastened in place.

Each spring assembly 44 includes a coil spring 47 (Fig. 2), a cup-like retainer 48 for enclosing the spring, a cover 49 (Fig. 8) which is affixed, such as by spot welding, to the open end of the retainer, and a safety cam 51 secured to the outer surface of the retainer, as best seen in Fig. 10. The inner end of spring 47 has a bend, or hook 52 for positioning in an axial slot 53 formed in the shaft 29, while the outer end of the spring has a bend, or hook 54 for positioning in a slot 56 formed in the retainer 48.

Affixed within the cable drum 37 by means such as welding, is a bracket 57 having integral lugs 58 (Fig. 9) which receive a pin 59, for pivotally securing to the bracket a safety stop 61. The safety stop 61 has an arm member 62 which in one position is arranged to extend through a slot 63 formed in the peripheral surface of the cable drum 37, and a plurality of cam engaging lugs 64, each of which is arranged to be in alignment with a safety cam 51 of a spring assembly 44. It is to be noted that when the arm 62 is in the extended position shown in Fig. 5, the end thereof can abut one of a plurality of lugs 65 formed on the inner periphery of the drum housing 17. A plurality of plungers 66 are positioned in the bracket 57 each in alignment with a safety cam 51 of a spring assembly, the front end of each plunger having a head portion 67 which is slidably supported in a hole 68 formed in the bracket, while the rear end of the plunger is slidably supported in a hole 69 formed in a lug 71 which is integral with the bracket. A coil spring 72 is compressively arranged about each plunger 66 between the head portion 67 and the lug 71, to urge the plunger in the direction of the safety stop 61, while a split washer 73 is secured upon the plunger on the other side of the lug 71, to limit movement of the plunger under the influence of spring 72. A loop spring 74 positioned upon the pin 59, is adapted to rotate the safety stop 61 in a direction whereby the lugs 64 thereof are in engagement with the safety cams 51 of the spring assembly 44.

The safety stop arrangement above described is provided to prevent dropping of the load being supported by the balancer in event a spring assembly should fail, as by spring breakage. The manner in which this is accomplished is as follows. When the spring assemblies 44 are in position upon the shaft 29, and the balancer is assembled and ready for use, the spring tension is adjusted by rotating the shaft 29 in a clockwise direction (Fig. 2) by means of the worm 42 and worm gear 43. As spring tensioning progresses, the spring retainer 48 will be rotated clockwise by reason of connection to the spring 47, and the safety cam 51 will urge an engaged plunger 66 rearward against the compression of spring 72. Assuming that all of the cams 51 are moved in this manner, they release the lugs 64 to permit the safety stop arm 62 to turn counter-clockwise under the influence of spring 74 until the arm attains the position shown in Fig. 2. In this position the arm 62 cannot abut against any of the lugs 65, hence permitting unobstructed rotation of the cable drum in either direction within the drum housing 17. Should a spring 47 break or fail during operation of the balancer, as seen in Fig. 5, the spring tension holding the associated spring retainer in clockwise position would no longer exist, hence the plunger spring 72 would force the plunger 66 and retainer cam 51 in counterclockwise direction; as a result thereof, the cam 51 would operate on a cam engaging lug 64 to overpower the relatively weak spring 74 and rotate the arm member 62 in clockwise direction thereupon, the outer end of arm 62 would abut one of the lugs 65, and positively lock the drum against rotation so that the cable 41 and supported load could not move downwardly. It is to be noted that the safety stop arrangement will operate when any one spring assembly fails.

A slot 76 having a guide shield 77, is provided in the drum housing 17 for the cable 41, said slot being of such length as to allow for the smooth and unobstructed winding and unwinding of the cable from the cable drum 37. Means are provided in the form of an adjustable cable guide plate 78, which is secured to the cable housing by means such as screws 80, to serve as a guide for the cable 41 as it is moving through the slot. The plate 78 has two elongated holes 85 for receiving the screws 80, whereby the plate can be adjusted to regulate the effective width of slot 76.

The free end of the cable 41 has secured thereto a cable safety hook 79 having a guard piece 81; in addition a cable stop rubber 82 is arranged upon the cable, said stop rubber being brought into contact with the drum housing 17 when the cable is fully wound on the cable drum 37. A cable stop clamp 83 is adjustably affixed to the cable 41 for purposes of supporting and positioning the cable stop rubber 82. By means of this arrangement the cable stop may be set so that the load is returned and held at any desired level.

From the foregoing it will be seen that the invention is effective in providing a spring balancer which has many advantages and features to meet the objectives as set forth near the beginning of the disclosure.

What we claim is:

1. A spring balancer comprising in combination a housing including shaft supporting means, a shaft rotatably mounted in the housing, a cable drum assembly rotatably positioned upon the shaft, said cable drum assembly being arranged to enclose one or more spring assemblies, each spring assembly including a spring retainer and a spring which is affixed to both the shaft and the retainer whereby the spring will provide rotative resistance to the cable drum in one direction of rotation, and a safety stop arrangement having an arm member which is operatively engageable with the housing to prevent free rotation of the cable drum in the said direction of rotation, wherein the safety stop arrangement includes a bracket affixed to the cable drum and having a plurality of spring loaded plungers, each of said spring retainers having a cam portion engageable with a plunger to further compress the spring of the plunger when the spring retainer is in normal position upon the shaft, said cam portion being adapted to engage the arm member and cause the latter to be placed into operative engagement with the housing member when the spring retainer is rotated a given amount from said normal position.

2. In a spring balancer including a housing having an annular series of stops about its inner wall, a shaft mounted in the housing, and a cable drum rotatably mounted within the housing on the shaft; a safety stop arrangement disposed within the drum, including a bracket fixed to the drum and carrying a spring loaded plunger; a spring assembly disposed within the drum and including a spring retainer rotatably mounted on the shaft, a coil spring wound about the shaft and having its inner end attached to the shaft and its outer end attached to the retainer, a cam integral with the outside of the retainer and having one face limited in pressing engagement with the plunger so as to further load the plunger, whereby rotation of the retainer relative to the drum in one direction is restrained and yielding resistance to rotation of the drum in the opposite direction is provided; an arm pivoted to the bracket and having a free end disposed for angular movement through a slot in the drum for engagement with one of the stops carried by the housing; spring means normally holding the arm pivoted out of such engagement and in a position abutting an opposite face of the cam; whereby breaking of the coil spring causes relaxation of the plunger and a consequent rotation of the retainer relative to the drum in a direction opposed to its normal tendency so as to cam the arm into engagement with a stop of the housing.

3. In a spring balancer having a housing, a spring winding shaft supported in the housing, a cable drum rotatably mounted on the shaft, and a coil spring disposed within the housing and about the shaft; a retainer enclosing the coil spring and rotatably mounted on the shaft, one end of the coil spring being attached to the shaft and the other end being attached to the retainer, a cam carried on the outside of the retainer, a bracket fixed to the interior of the drum, a plunger slidably carried in the bracket, a spring normally maintaining the plunger in a position projecting in part from the bracket, the cam having front and rear faces, the rear face adapted for abutment with the projecting end of the plunger, gear means for rotating the shaft so as to wind and hold wound the coil spring and as a consequence cause the retainer to abut the rear face of the cam against the plunger so as to force the latter inwardly of the bracket and to load the related plunger spring, an arm pivoted at one end upon the bracket and having its opposite free end disposed for angular movement through a slot of the drum for engagement with the housing, a depending finger carried by the arm member and engageable with the front face of the cam, a spring normally holding the arm member disengaged from the housing and in a position where the finger of the arm is limited against the front face of the cam; whereby this arrangement, breaking of the coil spring removes the pressure of the cam from the plunger and causes the latter to forcefully propel the retainer angularly so as to effect by the cam a pivoted action of the arm member into engagement with the housing.

4. In a spring balancer as in claim 3, wherein the inner wall of the housing includes an annular series of stops, and the free end of the pivot arm is adapted to engage with one of the stops when pivoted by the action of the cam.

5. In a spring balancer having a housing, a spring winding shaft supported in the housing, a cable drum rotatably mounted on the shaft and a plurality of coil springs disposed in the housing in neighboring relationship about the shaft, a separate retainer enclosing each coil spring and rotatably mouned on the shaft, one end of each coil spring being attached to the shaft and the other end being attached to the related retainer, a cam carried by the outside of each retainer, a bracket fixed to the interior of the drum, a plunger individual to each retainer and slidably carried in the bracket, a separate spring normally maintaining each plunger in a position projecting in part from the bracket, each cam having front and rear faces, the rear face of each cam adapted for abutment with the projecting end of the related plunger, gear means for rotating the shaft so as to wind and hold wound the several coil springs and as a consequence cause the rear face of each cam to abut against a related plunger so as to force the latter inwardly of the bracket to load the related plunger spring, a common arm member pivotable at one end upon the bracket and having its opposite free end disposed for angular movement through a slot of the drum for engagement with the housing, a plurality of depending fingers carried by the arm member, each finger being individual to and engageable with the front face of a cam member, a spring normally holding the arm member disengaged from the housing and in a position where each finger of the arm is limited against the front face of a related cam; whereby this arrangement, breaking of any one coil spring removes the pressure of the related plunger and causes the latter to forcefully propel the related retainer angularly so as to effect by the cam a pivot action of the arm member into engagement with the housing.

6. In a spring balancing device including a housing, a shaft supported within the housing and a cable drum rotatable on the shaft within the housing; a spring loaded retainer rotatable on the shaft and normally yieldingly resisting rotation of the drum in a particular direction, locking means carried by the drum and operable for engagement with the housing so as to lock the drum against rotation in said particular direction, means carried by the retainer and arranged to engage the locking means with the housing upon rotation of the retainer in said particular direction relative to the drum, and plunger means cocked by the spring loaded retainer and releasable upon relaxing of the spring load of the retainer to drive the latter in the said particular direction relative to the drum.

7. In a spring balancing device as defined in claim 6, wherein the means carried by the retainer and arranged to engage the locking means with the housing is a cam member, and the locking means includes a follower actuable by the cam member upon said rotation of the retainer and further includes a detent connected to the follower for movement by the latter into locking engagement with the housing.

References Cited in the file of this patent
UNITED STATES PATENTS

| | | |
|---|---|---|
| 1,794,825 | Benedict | Mar. 3, 1931 |
| 2,072,582 | Douglas | Mar. 3, 1937 |
| 2,204,938 | Le Bus | June 18, 1940 |

FOREIGN PATENTS

| | | |
|---|---|---|
| 535,884 | Great Britain | Apr. 24, 1941 |